United States Patent

[11] 3,621,312

[72] Inventor Albert Palmero
 Wallingford, Conn.
[21] Appl. No. 74,416
[22] Filed Sept. 22, 1970
[45] Patented Nov. 16, 1971
[73] Assignee The Superior Electric Company
 Bristol, Conn.

[54] SIMULATED TWELVE-POLE STEPPING MOTOR
 HAVING EIGHT ACTUAL POLES
 9 Claims, 9 Drawing Figs.
[52] U.S. Cl. .................................................. 310/49 R,
 310/163, 318/138, 318/254
[51] Int. Cl. .................................................. H02k 37/00
[50] Field of Search .......................................... 310/46,
 162, 163, 49 R; 318/138, 254

[56] References Cited
 UNITED STATES PATENTS
Re. 25,445 9/1963 Fredrickson ................. 310/163
3,148,319 9/1964 Fredrickson ................. 310/49 R

| 3,206,623 | 9/1965 | Snowdon | 310/162 |
| 3,343,014 | 9/1967 | Giles | 310/49 R |
| 3,428,837 | 2/1969 | Morreale et al. | 310/49 R |
| 3,509,392 | 4/1970 | Snowdon | 310/49 R |
| 3,510,699 | 5/1970 | Fredrickson | 310/49 R |
| 3,535,604 | 10/1970 | Madsen et al. | 310/49 X |

Primary Examiner—D. F. Duggan
Assistant Examiner—Mark O. Budd
Attorney—Johnson and Kline ABSTRACT: A stepping motor having a minimum of eight stator poles formed with teeth and a rotor having teeth with the effective pitches of the teeth being different to provide a three-tooth differential between the teeth. Each stator pole has a winding, and the windings are connected into two distinct phases and energized according to a four-step sequence to simulate a twelve-pole motor to cause the rotor to move one-fourth of a rotor tooth pitch for each step of the sequence.

PATENTED NOV 16 1971
3,621,312
SHEET 1 OF 2
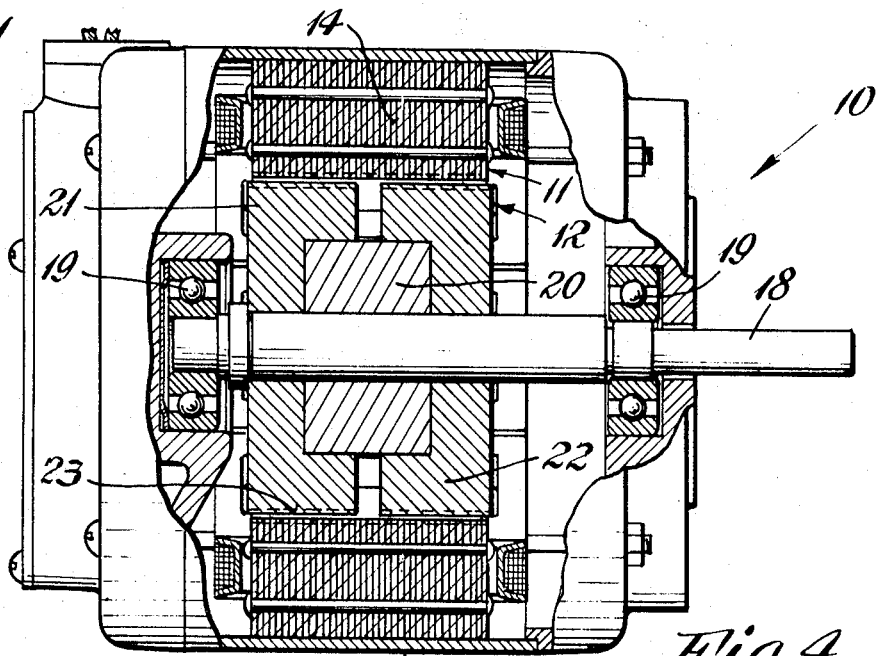
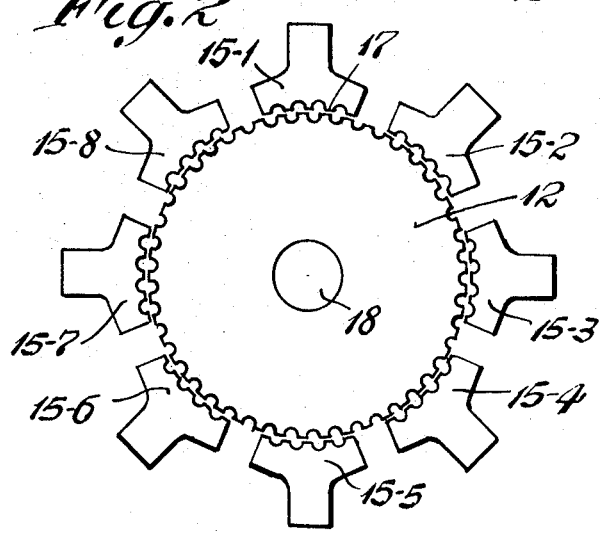
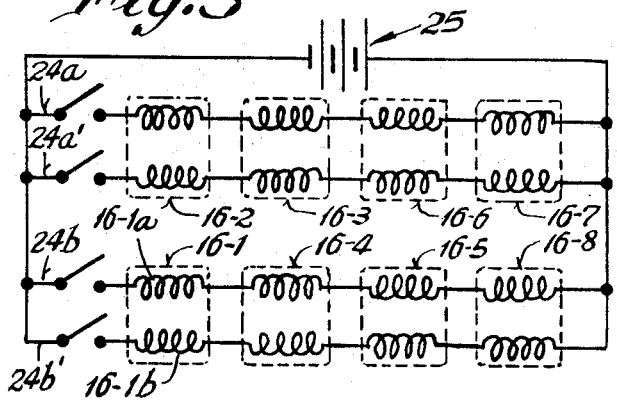
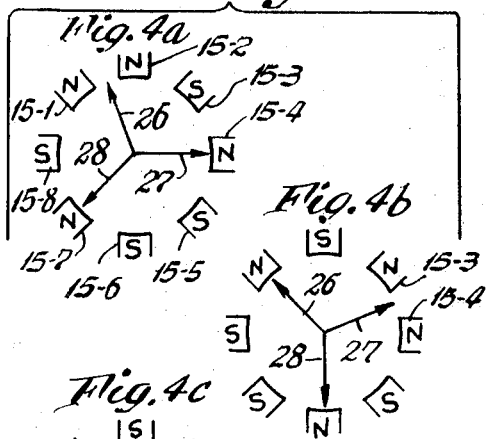
INVENTOR.
Albert Palmero
BY
Johnson and Kline
ATTORNEYS

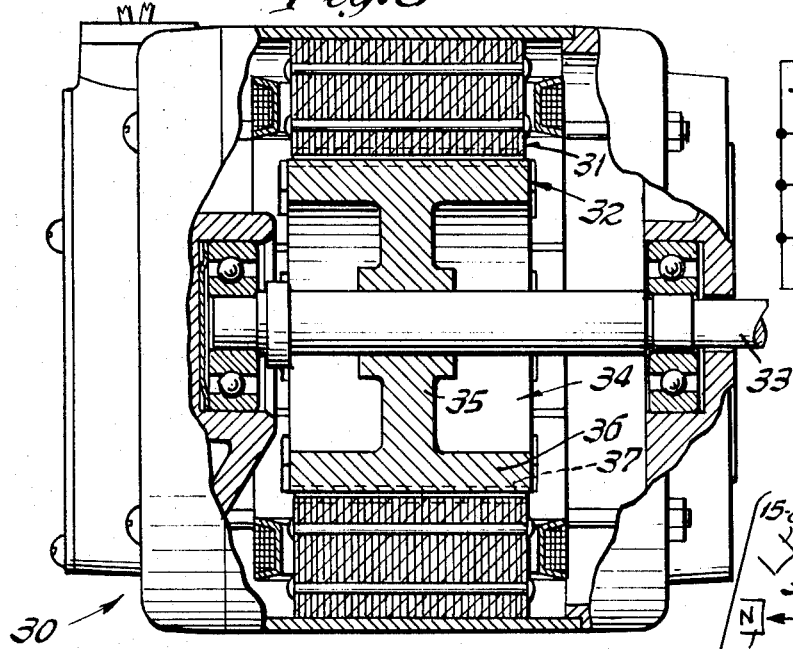
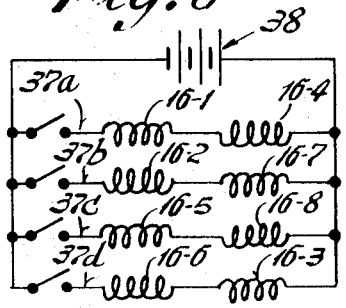
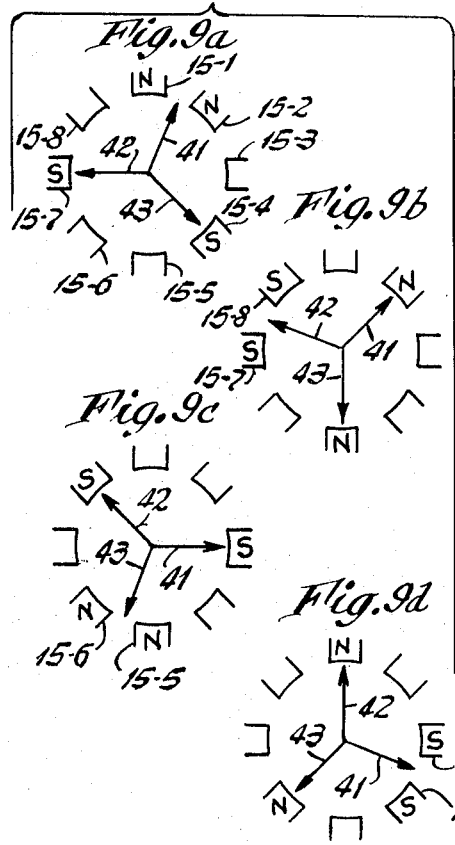
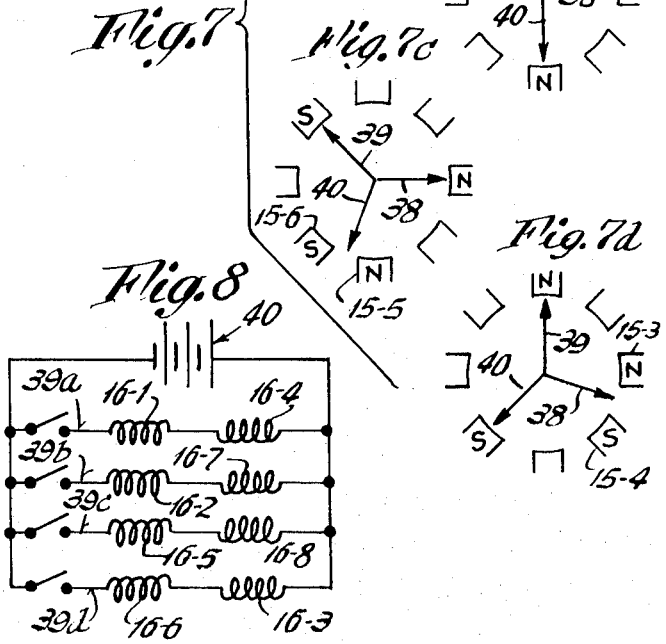

SIMULATED TWELVE-POLE STEPPING MOTOR HAVING EIGHT ACTUAL POLES

In U.S. Pat. No. Re. 25,445, assigned to the assignee of the present invention, there is disclosed a stepping motor having a rotor formed with 50 teeth and a stator formed with either actual poles with the poles also being formed with teeth, but with these stator teeth having a 48 pitch. Each of the poles has a winding with the winding of four alternate poles being connected together to form one phase and the remaining four intermediate pole windings being also connected together to form a second phase. By energizing the phases according to a four-step sequence, the rotor will advance one-fourth of a rotor tooth pitch for each step of the sequence, which in this instance is 1.8°.

The principles underlying the extent of movement for each step involve having the eight actual poles connected to form a four-magnetic-pole revolving field with the energization of the poles for one step of the four-step sequence producing a 90° electrical movement of the field. The four steps in the sequence produce one complete cycle of the stator magnetic field and cause the poles to have for the first step in the next sequence the same magnetic field as the first step in the prior sequence. Accordingly, the rotor requires 50 (teeth) times 4 (steps per sequence) or 200 steps of 1.8° to complete a revolution.

Using these principles of four actual stator poles connected to form two magnetic poles and for each pair of magnetic poles to require a tooth difference of one tooth, to design a motor having a three-tooth difference between the stator and rotor pitches, it becomes necessary to provide such a motor with six magnetic poles which, accordingly, would require 12 actual poles. The three-tooth difference enables a rotor having a different number of teeth to be utilized and thus provide a different extent of movement for each step. On the other hand it is also possible to provide the different extent of movement while maintaining a two-tooth difference by altering the pitch of the stator teeth.

As a specific embodiment, if it is desired to provide a stepping motor having 2° per step with a four-step energizing sequence, such a movement would require a rotor having 45 teeth. If a stator having eight actual poles is employed, it should have either 43 or 47 teeth, while if a 12-actual-pole stator is used it may have 48 teeth. In the former instance the number of stator teeth, when used with eight poles, renders the configuration of the stator teeth somewhat awkward as neither number is easily divisible by eight, while in the latter instance, though easily enabling four teeth to be assigned per pole, it causes the pole to be somewhat peripherally small with a greater portion of the stator accordingly being without teeth. Thus, in either instance, using presently known principles, a stator that is substantially structurally different than that presently being commercially utilized would be required in order to obtain the desired degree of movement for each step.

It is accordingly an object of the present invention to provide a stepping motor which utilizes a stator of presently commercial design, but by changing its manner of energization of its poles and the number of rotor teeth, a different number of steps per revolution may be obtained, and which also may be operated by presently existing four-step sequence stepping motor drive circuits.

Another object of the present invention is to provide a stepping motor having poles with windings and in which the windings are interconnected so as to simulate a motor having a different number of poles.

A further object of the present invention is to achieve the above objects with a stepping motor that may or may not have a permanent magnet carried by a rotor and which may or may not magnetize all of its poles simultaneously.

In carrying out the present invention, there is provided a stepping motor which has, for one embodiment herein disclosed, a structure essentially similar to that disclosed in the above-noted reissue patent. Thus the motor has a stator formed with eight actual poles, with the periphery of the poles being formed with teeth. Moreover, each pole has a winding which, when energized, causes the pole to assume a magnetic polarity. A rotor is circumscribed by the stator poles and carries a permanent magnet positioned between a pair of spaced end caps with the periphery of the end caps being formed with teeth. In another embodiment of the stepping motor that does not have a permanent magnet, the stator construction is the same, while the rotor has an elongated cylindrical periphery which is formed with peripherally extending teeth. In both embodiments of the invention, the pitch of the teeth of the rotor is selected to provide a desired movement for each step in a four-step stepping sequence while the stator teeth have a pitch which provides a three-tooth difference between the rotor and stator pitches.

In accordance with the permanent magnet embodiment of the invention, the eight windings of the poles are connected into a four-pole, two-phase configuration while the variable reluctance embodiment (no permanent magnet in the rotor) has four phases with there being two pole windings per phase. In both embodiments, the interconnection of the stator pole windings is such that for each step there are at least four poles whose windings are energized, with two of the poles being adjacent and the other two magnetized poles being spaced therefrom. A pole is considered attracting, as herein stated, when its polarity is such as to attract the part of the rotor that is adjacent thereto, and is considered nonattracting if its winding does not cause the pole to be magnetized or if the induced magnetic polarity is the same as that of the rotor portion opposite thereto where repulsion rather than attraction occurs.

In all embodiments of the motor, the stator field produced by the four energized poles of the stator is unsymmetrical in that there are three areas of attraction with one area consisting of two adjacent poles, while the other two areas are single poles. Moreover, while the areas are not evenly positioned about the rotor, the sum of the forces caused by the areas of attraction is essentially balanced to effect a stable position. Each step has the same unsymmetrical areas of attraction, though with different poles, and thus the extent of movement for each step is the same.

Other features and advantages will hereinafter appear.

Referring to the drawings:

FIG. 1 is an elevation, partly in section, of one embodiment of a motor in which the present invention is incorporated.

FIG. 2 is a diagrammatic representation of the stator poles and rotor.

FIG. 3 is a schematic diagram showing the interconnections of the windings for the embodiment of the motor shown in FIG. 1.

FIG. 4 is a diagrammatic representation showing the magnetic polarities and resulting vector magnetic field produced by energizing the windings according to a four-step sequence.

FIG. 5 is an elevation, partly in section, of another embodiment of a motor, commonly referred to as a variable reluctance type, in which the present invention may be incorporated.

FIG. 6 is an electrical schematic diagram of the interconnections of the windings of the motor shown in FIG. 5.

FIG. 7 is a diagrammatic representation of the magnetic polarities of the stator poles and resulting vector magnetic field when the windings in FIG. 6 are energized according to a four-step sequence.

FIG. 8 is a schematic diagram of a further embodiment of the interconnection of the windings of the motor shown in FIG. 5.

FIG. 9 is a diagrammatic representation similar to FIG. 7 of the magnetic polarity of the poles and resulting vector magnetic field produced by energizing the windings in FIG. 8 according to a four-step sequence.

Referring to the drawing, the embodiment of the motor shown in FIG. 1 is generally indicated by the reference numeral 10 and includes a stator 11, a rotor 12, and a housing 13. As shown, the stator 11 consists of a stack of identical laminations 14 which are shaped to form eight identical and equally spaced, inwardly directed poles 15–1 through 15–8.

Each pole has a winding 16-1 through 16-8, respectively, associated therewith. Accordingly, by energization of the winding of a pole, the pole can be caused to have a selected polarity of magnetism. Moreover, the inner periphery of each of the poles is formed with stator teeth 17 that are equally spaced and have in this specific embodiment a pitch of 48.

The rotor 12 includes a shaft 18 supported in the housing 13 by a pair of bearings 19 and having secured thereon a permanent magnet 20. The magnet is magnetized axially and causes one end cap 21 to have one magnetic polarity and the other end cap 22 to have the other magnetic polarity.

Each of the end caps is formed to have peripheral teeth 23, with the teeth being equally spaced and having in the particular embodiment herein disclosed a pitch of 45. As presently heretofore described, such a motor is disclosed in the above-noted reissue patent and is presently commercially available from the assignee, with the exception that the pitch of the rotor teeth is different.

As shown in FIG. 3, each of the windings 16 is bifilar so that each includes two separate portions 16-1a and 16-1b as indicated for the winding 16-1 in FIG. 3; the portion 16-1a, when energized, causes the pole 15-1 to be magnetized as an N pole, while the other portion 16-1b, when energized, causes the pole 15-1 to be magnetized with an S polarity. Specifically, in FIG. 3 each portion which induces an N magnetic polarity in its associated pole is schematically shown by the loops of the portion extending downwardly, such as the portion 16-1a is shown, while each portion that induces an S pole when energized has its loops extend upwardly, as the portion 16-1b 16-2 so shown.

The windings are connected into four distinct phases 24a, 24a', 24b, and 24b', with each phase having a portion of the windings of four poles so that, when a phase is energized, four poles are magnetized. The phase 24a when energized causes the poles 16-2 and 16-7 to be N poles and 16-3 and 16-6 to be S poles. The other phases, when energized, cause the windings in the phase to induce a magnetic polarity in their associated pole, depending on the disposition of the loops of the windings as schematically shown in FIG. 3.

For controlling energization of the windings, there is provided a source of direct current, such as a battery 25 to which the phases are parallelly connected and selective energization of the phases is achieved by a switch associated with each phase.

It will be understood that the energization for the embodiment of the motor herein disclosed is a four-step sequence that is utilized in other similar motors and consists of energizing two phases at a time with the sequence being 24a and 24b; 24a and 24b'; 24a' and 24b'; 24a' and 24b; 24a and 24b etc. for one direction of rotation of the rotor; while, if the sequence is reversed, then the rotor will rotate in the opposite direction.

Shown in FIG. 4 are the polarities of the poles for each step in the above-noted sequence. Referring to FIG. 4a, the phases 24a and 24b are energized, which causes the poles 15-1, 15-2, 15-1, and 15-7 to be N poles, while the other four poles are caused to be S poles. The poles 15-1 and 15-2 have a similar polarity and their combined magnetic effect is vectorally shown by an arrow 26, while the magnetic effect of the pole 15-4 is shown by an arrow 27, and the magnetic effect of the pole 15-7 is shown by an arrow 28. For the purpose of explanation, it will be understood that the herein discussion with respect to FIG. 4 refers to the end cap 22 which is polarized by the magnet 20 to be an S pole, and hence the teeth thereof will be attracted to the above-noted end poles. For the end cap 21, which has an N polarity, the same attraction would exist, but it would only be to the S poles, 15-3, 15-5, 15-6 and 15-8.

The rotor assumes a position of least reluctance and essentially a tooth of the rotor will attempt to be aligned with the stator along each of the arrows 26, 27 and 28. However, as the arrows 26 and 28 are separated by 112½°, which is also true of the arrows 26 and 27, it is accordingly impossible for teeth to be aligned between the stator and rotor along the arrows 27 and 28, as the misalignment is 7½°. However, a rotor tooth will essentially attempt to be aligned along the arrow 26, but actual alignment cannot occur in view of the absence of teeth between the adjacent poles 15-1 and 15-2. Moreover, it will be understood that the windings magnetize the poles so as to produce three areas as shown by the arrows, where the stator attracts the adjacent rotor teeth. The areas are unsymmetrical to the extent that they are not evenly spaced from each other, and also that two adjacent poles which form the arrow 26 produce a stronger magnetic field than the poles producing the arrows 27 and 28. However, along a diametric line aligned with arrow 26, the vectoral forces are essentially balanced to provide rotational equilibrium, and hence produce a stable position for the rotor.

In order to effect the next step in a sequence, the poles are energized as shown in the representation FIG. 4b by energizing the phases 24a and 24b'. The poles 15-3 and 15-4 now form the double pole, and it has mechanically advanced 90° from its previous position. However, the vector magnetic field has actually rotated counterclockwise a 30° step as the arrow 26 has moved 22½°, the arrow 27, 22½°, and the arrow 28, 45°, which produces a sum of 90°; but, as the vector field has three vectors, then the actual effective movement of the whole field is a 30° movement counterclockwise.

The next step in the sequence requires the energization of the phases 24a' and 24b' to produce the magnetic polarity of the poles shown in FIG. 4c. The vectors 26, 27, and 28 are also shown and it will be appreciated that, though the reference double pole has advanced to the poles 15-5 and 15-6, the vector magnetic field has again actually only turned 30° counterclockwise. Similarly, as shown in FIG. 4d, which indicates the magnetic polarities of the poles for the fourth step of the sequence with phases 24a' and 24b being energized, the double pole is now at the poles 15-7 and 15-8, which effectively advances the vector magnetic field another 30° movement counterclockwise. The next step is the repeat of the polarities shown in FIG. 4a, which again produces the same change of the double pole advancing 90°, but with the vector field turning 30° counterclockwise.

Thus in each of the four positions of the sequence, the rotor will be at a stable position, and this stable position changes 30 electrical degrees for each step. However, the 30° relates to the effective movement which one tooth would have, it being understood that in order to move one complete tooth pitch, the electrical field has to move 120° for the particular embodiment herein described where the stator and rotor pitch differ by three teeth. Thus the rotor will, in a four-step sequence, produce four separate movements of identical length, with the four movements producing a rotational step which is the reciprocal of the rotor pitch.

The direction of rotation is determined by whether the rotor has more teeth or less teeth than the stator. In the embodiment given, with the rotor having a 45 pitch and the stator having a 48 pitch, the rotor will revolve in the opposite direction than the magnetic field is revolving, and hence will revolve clockwise. On the other hand, if the rotor pitch is 51 (more than the stator), then the rotor will revolve counterclockwise, the same as the magnetic field.

It will be noted in FIG. 4 that each of the arrows indicated a spaced area of magnetic attraction to the portion of the rotor opposite thereto, which has an S polarity. As in the normal construction of the motor, the other end cap 21 is indexed one-half a tooth pitch from the end cap 22 and it will have an N polarity, and hence will have three spaced areas of attraction to the four S poles shown in this figure.

It will also be understood, that while the end caps are indexed and the stator poles are aligned, it is also possible to maintain the end caps aligned and to index the portions of the stator opposite the two end caps one-half a tooth pitch if desired.

The present invention is also usable in a variable reluctance type motor in which the rotor does not have a permanent magnet and depends upon assuming a position of least reluctance when the poles are energized of different magnetic polarity. Referring to FIG. 5, the motor is generally indicated by the reference numeral 30 and has a stator 31 and a rotor 32. The stator is essentially the same as the stator in the previous embodiment and hence has eight poles, each of which has a winding; and for convenience the poles and windings are given the same reference numerals as in the prior embodiment. The only only difference is that in this embodiment each winding is formed of only one portion because every pole is caused to have only one magnetic polarity. The rotor includes a shaft 33 upon which is mounted a member 34 having a hub 35 and a cylindrical periphery 36, with the periphery 36 being formed of magnetic material. Also, equally spaced teeth 37, which in the present embodiment may have a pitch of 45 or 51 with the stator having a 48 pitch as in the previous embodiment, are formed on the periphery 36. For a more complete description of this motor, reference is made to application Ser. No. 737,191, filed June 14, 1968 now U.S. Pat. No. 3,535,604, assigned to the assignee of the present invention.

Referring to FIG. 6, there is shown one manner of interconnecting the windings 16-1 through 16-8. Thus, the windings 16-1 and 16-4 are connected to form a first phase 37a; the windings 16-2 and 16-7 are serially connected to form phase 37b; the windings 16-5 and 16-8 are connected to form the phase 37c; while the remaining windings 16-6 and 16-3 are connected to form the phase 37d. As schematically shown by the disposition of the loops, the windings 16-1, 16-7, 16-5, and 16-3, when energized, cause their respective poles to be N poles, while the remaining windings when energized induce their associated poles to be S poles.

In use, the motor 30 is also energized according to a four-step sequence to cause the rotor to advance one tooth pitch by energizing of the phases 37a and 37b; 37b and 37c; 37c and 37d; and 37d and 37a. In each step only four of the windings are energized at a time, as compared to all eight windings in the prior embodiment.

It will be noted that each phase is shown connected through switches to a battery 38 to schematically illustrate one method of energizing the windings in the desired sequence. It will be clear, however, that automatic switching circuits are more effectively used, as in the prior embodiment.

As shown in FIG. 7a, the poles 15-1, 15-2, 15-4, and 15-7 are magnetized for the first step in the sequence as phases 37a and 37b are energized. As in the prior embodiment, the four magnetized poles form three spaced areas of magnetic attraction to the rotor indicated by the arrows 38, 39 and 40. The arrow 38 is the result of the two adjacent poles 15-1 and 15-2 being magnetized, and hence represents one area to which the rotor has a greater magnetic attraction than the other two areas represented by the arrows 39 and 40. Moreover, as in the prior embodiment, the angle between the arrows 38 and 39 and 38 and 40 is 112½° whereas the angle between the arrows 39 and 40 is 135°. As shown in FIGS. 7b, 7c, and 7d, the energization of the phases, according to the remainder of the four-step sequence, produces a 90° rotation of the two energized adjacent poles in a counterclockwise direction, while the vector magnetic field advances 30° per step in the clockwise direction.

The rotor at each position will assume a position of least reluctance for each step. As the forces are balanced along a diametric line through the arrow to the two adjacent magnetized poles, there is rotational equilibrium providing a stable position. Also, each step has the same extent of movement.

In the embodiment shown in FIGS. 8 and 9, the windings are interconnected to have the two energized adjacent poles be of the same polarity rather than of the opposite polarity as in the prior embodiment. As shown in FIG. 8, the windings 16-1, 16-2, 16-5, and 16-6 are wound to induce their associated poles to be N poles when the windings are energized, while the remaining windings induce their associated poles to be S poles. The same windings 16-1 and 16-4 are connected to form phase 39a; windings 16-2 and 16-7 form phase 39b; windings 16-5 and 16-8 form phase 39c; and windings 16-6 and 16-3 form phase 39d. Each of the phases is illustrated as being connected through a switch to a source of direct current 40. The winding phases are energized in the same four-step sequence as in the prior embodiment, namely 39a and 39b; 39b and 39c; 39c and 39d; 39d and 39a; 39a and 39b, etc.

Referring to FIG. 9, for the first step where phases 39a and 39b are energized, poles 15-1 and 15-2 are N poles, while poles 15-4 and 15-7 are S poles. For the next step, when phases 39b and 39c are energized poles 15-7 and 15-8 are magnetized S poles, while poles 15-2 and 15-5 are magnetized N as illustrated in FIG. 9b. FIGS. 9c and 9d show the magnetization for the remaining two steps in the sequence when phases 39c and 39d and 39d and 39a are energized. The areas of attraction to the rotor are shown by arrows 41, 42 and 43, and they are identical for each step to the corresponding step shown in FIG. 7.

In this embodiment, as in the previous embodiments, there is magnetic attraction for the tooth rotor at three spaced areas, with the areas being unsymmetrical and with one of the areas being achieved by having two adjacent poles magnetized. Moreover, the two magnetized adjacent poles are moved electrically 90° for each step, while the vector magnetic field moves 30° per step. The rotor in this embodiment, if it has 45 teeth, which is less than the stator tooth pitch, will accordingly rotate counterclockwise as the vector magnetic field rotates clockwise.

The path of the magnetic flux in the embodiment shown in FIGS. 6 and 7 is, for FIG. 7a, from N pole 15-1 through the adjacent rotor periphery 36 to S pole 15-2, and from N pole 15-7 through the adjacent rotor periphery 36 to S pole 15-4. For the embodiment shown in FIGS. 8 and 9, for FIG. 9a, the path is from N pole 15-1 to S pole 15-7, and from N pole 15-2 to S pole 15-4 through the portions of the rotor periphery 36 between the poles.

While the above-disclosed embodiments have rotors and stators which have a tooth pitch that is different, it will be understood that the present invention may also be utilized in stepping motors of similar construction wherein the pitch of the stator and rotor teeth are the same, but in which the stator poles, rather than being equally spaced, are advanced a fraction of a tooth pitch from each other. Also, while a motor having eight poles is shown, the invention is capable of being utilized with motors having multiples of eight poles, such as a 16-pole motor with a six-tooth difference between the stator and rotor pitches. In both instances there will be, for each eight poles, three areas of magnetic attraction for the rotor.

It will accordingly be appreciated that there has been disclosed a stepping motor having a stator and a rotor in which both the stator and rotor are formed with teeth. The stator is formed to have eight actual poles which are interconnected in a manner which causes three unsymmetrical spaced areas of magnetic attraction between the stator and the rotor to occur. A rotor assumes for each energization a position of minimum reluctance; and, as the unsymmetrical field rotates 30° for each change of energization to the windings, the rotor will move one-fourth of a tooth pitch for each change, thus providing for a four-step sequence the desired movement of one rotor tooth pitch. Moreover, though the magnetic field is unsymmetrical, it has rotational equilibrium and is identical for each of the steps of the sequence so that the rotor moves steps which have equal movement.

Variations and modifications may be made within the scope of the claims and portions of the improvement may be used without others.

I claim:

1. A stepping motor comprising a stator formed with at least eight actual individual poles with the periphery of the poles being formed with teeth and a winding associated with each pole which upon energization effects magnetization of its associated pole; a rotor having a periphery formed with teeth and being positioned within the stator to have its teeth be opposite the stator teeth and means for energizing the windings of the poles to provide an unsymmetric magnetic field having three spaced magnetic areas to which the adjacent rotor teeth are magnetically attracted.

2. The invention as defined in claim 1 in which one of the spaced areas of magnetic attraction includes two adjacent poles that are both magnetized to be attractive to the rotor teeth and the other two areas each consist of a single pole with there being at least one nonattractive pole between the one area and each of the other areas.

3. The invention as defined in claim 2 in which the means for energizing includes changing the three spaced attractive areas from a first condition to a second condition having three spaced attractive areas and in which the one area of two adjacent magnetized poles is located 90 electrical degrees in the second condition from its location in the first condition.

4. The invention as defined in claim 1 in which the three spaced magnetic areas form a vector magnetic field and in which the means for energizing includes means for changing the energized windings to change the areas to a different location that rotates the vector magnetic field 30° from its prior location.

5. The invention as defined in claim 4 in which two of the spaced areas move the same from their prior locations to their changed locations and the other spaced area moves twice as far.

6. The invention as defined in claim 1 in which the rotor includes a permanent magnet and a pair of end caps having the rotor teeth formed on their periphery and in which the attracted areas for one end cap has stator poles magnetized of one polarity and the attracted areas for the other end cap has stator poles magnetized of the opposite polarity.

7. The invention as defined in claim 1 in which the rotor includes a substantially cylindrical member formed of paramagnetic material having the rotor teeth formed on its periphery and in which means for forming the attracted areas includes energizing four poles with two poles each having the same magnetic polarity.

8. The invention as defined in claim 7 in which one of the attracted areas is formed by two adjacent poles being magnetized and in which the poles are magnetized to have the same polarity.

9. The invention as defined in claim 7 in which one of the spaced areas is formed by two adjacent poles being magnetized and in which the poles are magnetized to have the opposite polarity.

* * * * *